(12) United States Patent
Keller

(10) Patent No.: US 12,082,719 B2
(45) Date of Patent: *Sep. 10, 2024

(54) SYSTEMS AND METHODS RELATED TO STORAGE RACKS

(71) Applicant: Adam J Keller, Fremont, WI (US)

(72) Inventor: Adam J Keller, Fremont, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/306,879

(22) Filed: May 3, 2021

(65) Prior Publication Data

US 2021/0251399 A1 Aug. 19, 2021

Related U.S. Application Data

(63) Continuation of application No. 16/358,027, filed on Mar. 19, 2019, now Pat. No. 10,993,552.

(51) Int. Cl.
*A47F 5/00* (2006.01)
*A47B 96/02* (2006.01)
*B65G 1/02* (2006.01)

(52) U.S. Cl.
CPC .......... *A47F 5/0093* (2013.01); *A47B 96/025* (2013.01); *B65G 1/026* (2013.01)

(58) Field of Classification Search
CPC ........ A47F 5/0093; A47F 1/12; A47B 96/025; A47B 88/437; A47B 96/021; A47B 88/493; A47B 57/10; A47B 31/00; A47B 2210/0056; B65G 1/026; B65G 1/06; B65G 1/023; B65G 1/02; B65G 19/42
USPC ........ 211/162, 151, 126.15, 187, 126.2, 134, 211/59.2
See application file for complete search history.

(56) References Cited

U.S. PATENT DOCUMENTS

| 968,201 | A | * | 8/1910 | Shannon | ............... A47F 5/0093 |
|---|---|---|---|---|---|
| | | | | | 211/28 |
| 1,071,671 | A | * | 8/1913 | McCurdy | .................. A47F 7/30 |
| | | | | | 211/28 |
| 1,114,455 | A | * | 10/1914 | Fisher | ....................... A47F 7/30 |
| | | | | | 211/28 |
| 1,971,744 | A | | 8/1934 | Brykczynski et al. | |
| 2,986,284 | A | | 5/1961 | Colbert | |
| 3,038,613 | A | * | 6/1962 | Sylvester | ............... A47B 47/00 |
| | | | | | 211/162 |
| 3,456,808 | A | | 7/1969 | Bridenstine | |

(Continued)

FOREIGN PATENT DOCUMENTS

EP 0109950 A1 * 5/1984 ........... B65G 1/0464

OTHER PUBLICATIONS

USPTO, Office Action for related U.S. Appl. No. 16/358,027, dated Jun. 11, 2020, 6 pages.

(Continued)

*Primary Examiner* — Hiwot E Tefera
(74) *Attorney, Agent, or Firm* — Smith Keane LLP

(57) ABSTRACT

Systems and methods directed to shelving systems include a frame and one or more translatable shelves. The shelves are supported on rails and are horizontally translatable from a rearward position to a forward position. When adjacent shelves are respectively most rearward and most forward, certain shelf and frame structural cooperation enhance shelf access and shelf removability. Provided a single shelving kit, certain shelf configuration may be customized for particular end uses.

10 Claims, 16 Drawing Sheets

(56) References Cited

U.S. PATENT DOCUMENTS

| | | | |
|---|---|---|---|
| 3,465,897 A * | 9/1969 | Horn | A47B 81/00 |
| | | | 211/151 |
| 3,894,634 A | 7/1975 | Gotham et al. | |
| 4,482,066 A | 11/1984 | Dykstra | |
| 4,955,489 A | 9/1990 | Allen | |
| 4,982,851 A | 1/1991 | Konstant | |
| 5,080,241 A | 1/1992 | Konstant | |
| 5,137,159 A * | 8/1992 | Collins | B65G 1/026 |
| | | | 211/151 |
| 5,143,344 A * | 9/1992 | Johnson | B28B 5/04 |
| | | | 108/106 |
| 5,184,738 A | 2/1993 | Allen | |
| 5,203,464 A | 4/1993 | Allen | |
| 5,312,004 A | 5/1994 | Krummell et al. | |
| 5,350,270 A | 9/1994 | Stallard et al. | |
| 5,419,444 A | 5/1995 | Strom | |
| 5,476,180 A | 12/1995 | Konstant | |
| 5,524,776 A | 6/1996 | Hall | |
| 5,860,786 A | 1/1999 | Aubrecht | |
| 6,135,299 A | 10/2000 | Burgess | |
| 6,652,213 B1 * | 11/2003 | Mitchell | B65G 1/0492 |
| | | | 414/284 |
| 6,814,362 B2 | 11/2004 | Hanson et al. | |
| 6,851,562 B2 | 2/2005 | Gorniak et al. | |
| 7,484,631 B2 | 2/2009 | Bothun | |
| 9,708,122 B1 | 7/2017 | Johncox | |
| 9,764,897 B1 | 9/2017 | Kinney | |
| 10,993,552 B2 * | 5/2021 | Keller | A47F 5/0093 |
| 2006/0231517 A1 | 10/2006 | Bothun et al. | |
| 2008/0290056 A1 | 11/2008 | Hardy | |
| 2016/0000221 A1 * | 1/2016 | Brunner | A47B 96/06 |
| | | | 312/249.8 |
| 2017/0311721 A1 | 11/2017 | Bruckner | |

OTHER PUBLICATIONS

USPTO, Office Action for related U.S. Appl. No. 16/358,027, dated Jul. 30, 2020, 12 pages.
USPTO, Office Action for related U.S. Appl. No. 16/906,683, dated Nov. 13, 2020, 10 pages.
Rack Storage UK Limited, Storage Metal Sheets (0:58), https://youtu.be/QgZu7ctTAWg, Oct. 23, 2016, last accessed Oct. 4, 2019.
Sheet steel rack holds 60"×120" steel with 7 roller drawers For Sale (2:11), https://youtu.be/fYtam-wuGOw, Jun. 4, 2013, last accessed Oct. 4, 2019.
Eurostorage, Horizontal metal sheet rack with expendable drawers (1:17), https://youtu.be/inigwPaisr0, Jun. 21, 2019, last accessed Oct. 4, 2019.
USPTO, Office Action for related U.S. Appl. No. 16/906,683, dated Mar. 10, 2021, 12 pages.
USPTO, Non-final office action for related U.S. Appl. No. 16/906,683, dated Sep. 10, 2021, 12 pages.
USPTO, Non-final office action for related U.S. Appl. No. 16/906,683, dated May 18, 2022, 13 pages.

* cited by examiner

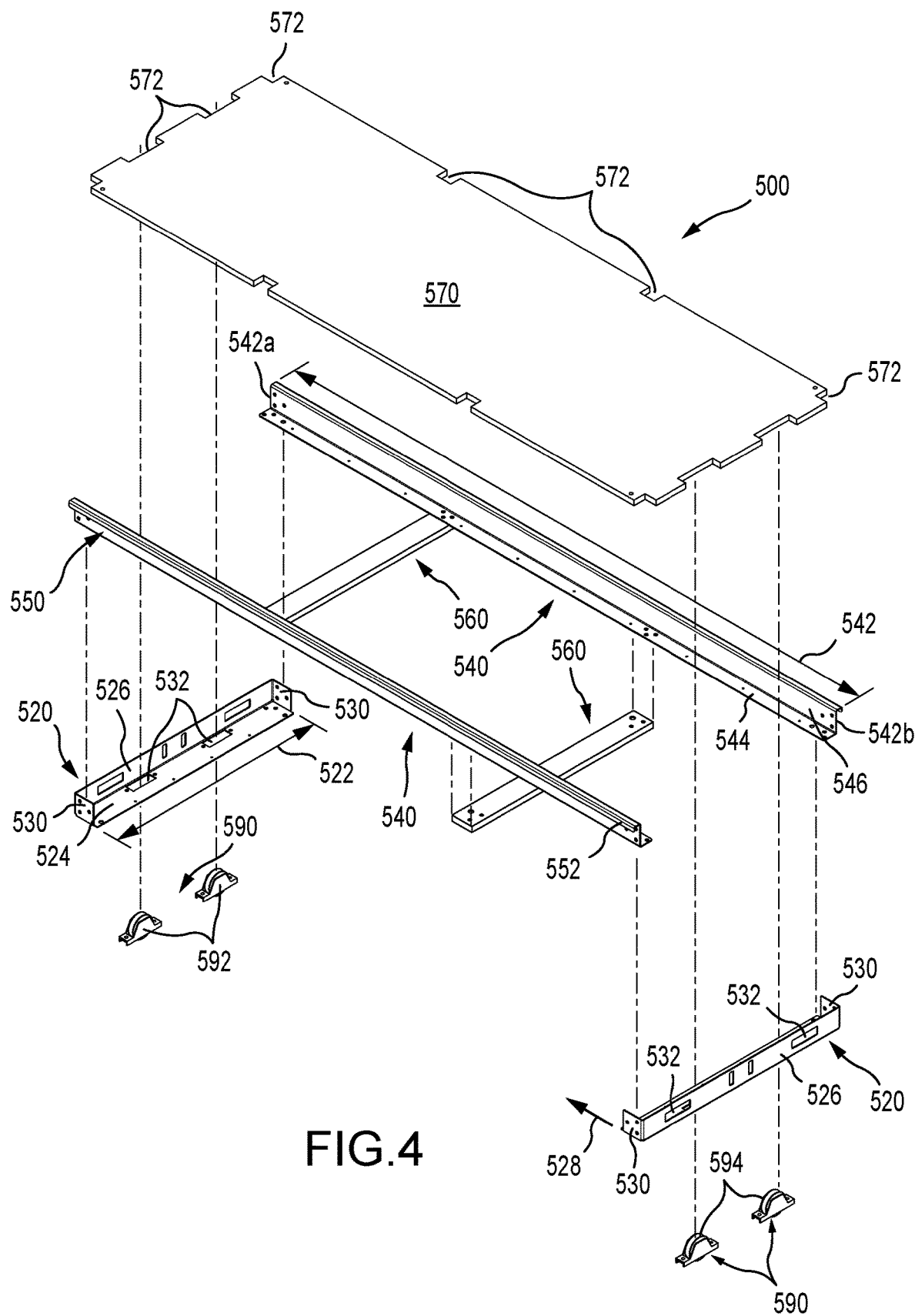

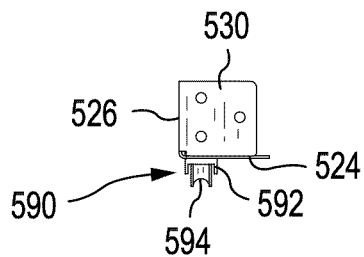
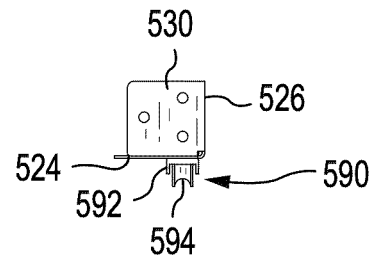
FIG.6　　　　　　　FIG.7
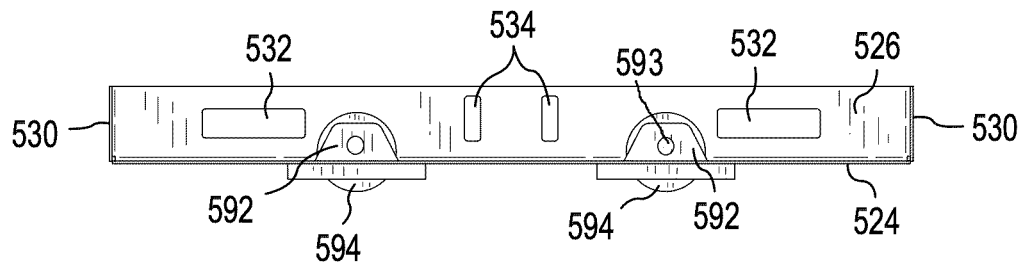
FIG.8
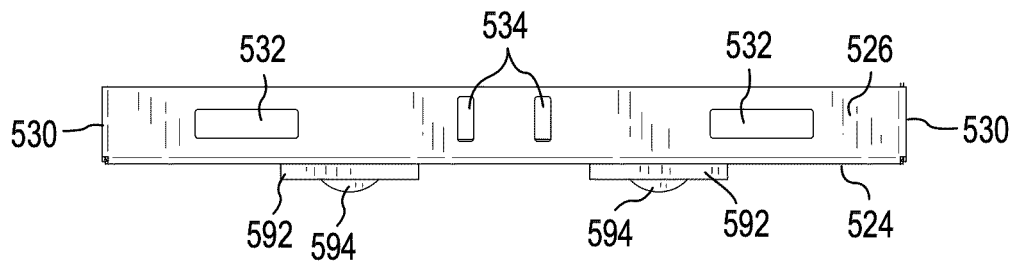
FIG.9

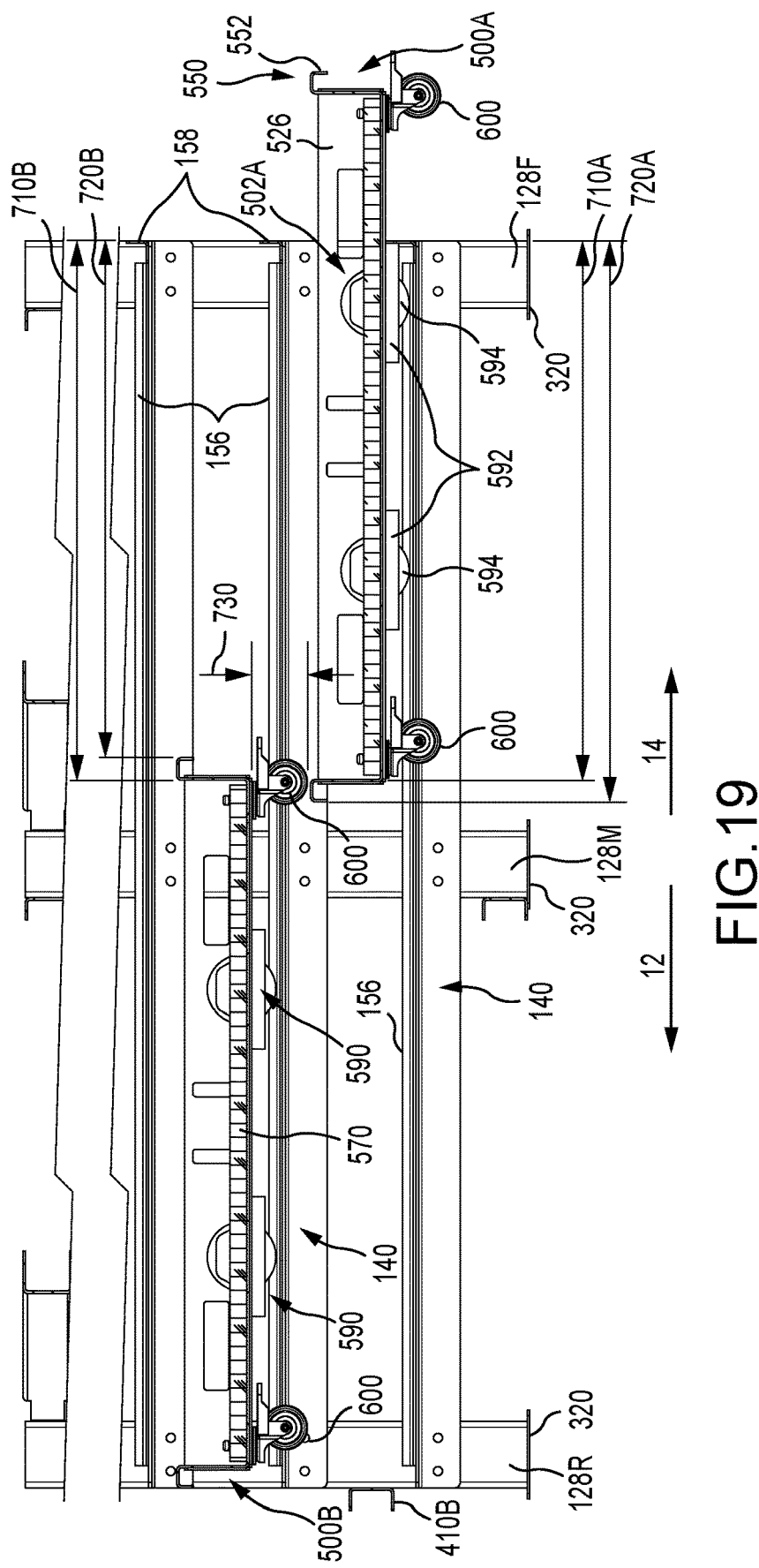

SYSTEMS AND METHODS RELATED TO STORAGE RACKS

RELATED APPLICATIONS

This application is a continuation of application Ser. No. 16/358,027 filed 19 Mar. 2019, and entitled "Systems and Methods Related to Storage Racks."

BACKGROUND OF THE INVENTION

The present invention relates generally to storage and retrieval systems and more particularly to advantageous improvements in horizontally translatable storage shelving.

Prior horizontally translatable open and closed storage shelving (e.g. drawers, sliding shelves, bins, etc.) has long been used for vertical storage. However, conventional drawers and shelving may suffer from features that may be disadvantageous in particular storage applications.

Many prior horizontal storage systems provide storage spaces of a fixed vertical depth. That is, in a given design, while multiple drawer positions may be provided, and those drawers may be removable, there may be insufficient number of possible drawer positions to maximize utilization of vertical space.

Prior shelving may also include impediments to horizontal translation (e.g., drawer slide stops) thereby occluding vertical access to an entire storage space. For instance, some prior drawer systems limit outward travel of a drawer so as to prevent accidental dislodgement of the drawer from its support structure. However, prior drawer stops may have prevented drawers positioned lower in a drawer stack from extending sufficiently beyond a front portion of an adjacent upper drawer, such that the upper drawer prevented complete vertical access into and out from the storage space of the lower drawer.

Even where prior shelving systems provided complete vertical access to a storage space, the systems often limited removal of shelving from its support racks in a way that substantially maintains a horizontal shelf during removal because of overlap of vertically adjacent drawers. That is, many prior drawer (and drawer slide) systems required a drawer to be tipped to a predetermined angle to allow withdrawal of the drawer from its supporting glides, rails or other structure. Additionally or alternatively, some prior drawer systems included manual locks that must be disengaged while the drawer or shelf is being horizontally moved to dislodge it from a support rail. Manual locks may be especially complicated to operate if drawer contents are relatively heavy (e.g., greater than 40 pounds) or if the width of the drawer is substantially equal to or greater than about five feet.

Accordingly, the art of horizontal storage would benefit from a storage system that addresses one or more of the drawbacks of prior shelving or drawer systems.

SUMMARY OF THE INVENTION

Embodiments of shelving systems according to the present invention multiple selectable vertical storage space heights, allow complete vertical access to a shelf when supported by support structure, provide complete vertical clearance between vertically adjacent shelves in certain orientations, and/or allow ease of drawer removal and translation after removal.

An embodiment of a shelving system according to the present invention has a frame including first and second side frames extending along a side frame depth at least substantially parallel to a direction of travel, the first side frame disposed opposite the second side frame across a storage cavity, which may be substantially parallelepiped in shape. First and second track members are supported by the first side frame, the second track member being disposed vertically above the first track member. Third and fourth track members are supported by the second side frame, the fourth track member being disposed vertically above the third track member. A first shelf is supported by and movable along the first and third track members, the first shelf comprising a first shelf frame supporting a first shelf bottom received in or otherwise supported by the first shelf frame, the first shelf frame comprising a first pair of opposing end brackets disposed above the first and third track members. A second shelf is supported by and movable along the second and fourth track members, the second shelf comprising a second shelf frame supporting a second shelf bottom received in or otherwise supported by the second shelf frame, the second shelf frame comprising a second pair of opposing end brackets disposed above the second and fourth track members. The track members may have a rib or groove extending along the direction of travel.

According to an aspect of a shelving system according to the present invention, each of the first and/or second pair of end brackets is substantially identical to the other.

According to another an aspect of a shelving system according to the present invention, each shelf frame and respective shelf bottom cooperatively define an open-top substantially parallelepiped drawer cavity.

According to still another an aspect of a shelving system according to the present invention, a first plurality of followers is secured to the first shelf and cooperate with the first track member, and a second plurality of followers is secured to the first shelf and cooperate with the third track member. Each of the followers includes a wheel, each wheel being rotatably secured to its respective shelf by an axle positioned preferably within the drawer cavity. Each follower may include a pillow block supporting the axle, the pillow block secured to the shelf frame and/or bottom.

According to yet another an aspect of a shelving system according to the present invention, the first shelf and the second shelf are preferably movable in opposite forward and rearward directions along the direction of travel between a forward travel limit position and a rearward travel limit position. The limit positions for the respective shelves may be vertically aligned or offset. When the second shelf is in its rearward travel limit position and the first shelf is in its forward travel limit position, a majority of the first shelf is preferably within the side frame depth.

According to a further aspect of an embodiment of a shelving system according to the present invention, a fifth track member may be supported by the first side frame between the first and second track members, and a sixth track member may be supported by the second side frame between the third and fourth track members, but a shelf may have been removed or never supported by such fifth and sixth track members, such that vertical space between the first shelf and the second shelf is free from any additional shelf.

According to a still further aspect of an embodiment of a shelving system according to the present invention, when the second shelf is in its rearward travel limit position and the first shelf is in its forward travel limit position, the storage cavity vertically above the first shelf is completely devoid of any portion of the second shelf.

According to a still further aspect of an embodiment of a shelving system according to the present invention, the system further includes a plurality of casters freely depending downwardly from the second shelf, wherein no amount of weight of the second shelf is supported by the casters while the second shelf is supported by the second and fourth track members.

According to another embodiment of a device according to the present invention, it includes a frame defining a parallelepiped storage cavity, the frame including a left end bracket and a right end bracket secured to a front lateral bracket and a rear lateral bracket. A shelf bottom is supported about a majority of its perimeter by the frame. First and second followers secured to the left end bracket, and third and fourth followers secured to the right end bracket. The followers are configured to assist in translation of the frame in a predetermined travel direction and wherein each of these followers includes a wheel, the wheel being rotatably secured to its respective shelf by an axle rotatable about an axle axis that is positioned within the shelf, a majority of the wheel being positioned within the shelf. A handle may be formed in or by the front lateral bracket, and/or the rear lateral bracket may be substantially identical to the front lateral bracket.

According to an aspect of an embodiment of a device according to the present invention, the left end bracket extends along a left end bracket length between the front lateral bracket and the rear lateral bracket and the left end bracket has an open L-shaped cross-section taken perpendicular to the left end bracket length. Also, the right end bracket extends along a right end bracket length between the front lateral bracket and the rear lateral bracket and the right end bracket has an open L-shaped cross-section taken perpendicular to the right end bracket length.

According to another aspect of an embodiment of a device according to the present invention, each follower comprises a pillow block supporting an axle about which a wheel is rotatable only along the travel direction.

BRIEF DESCRIPTION OF THE DRAWINGS

FIG. 4 is a partial assembly view of an embodiment of a shelf according to the present invention.

FIG. 6 is a front elevation view of the embodiment of FIG. 5.

FIG. 7 is a rear elevation view of the embodiment of FIG. 5.

FIG. 8 is a right elevation view of the embodiment of FIG. 5.

FIG. 9 is a left elevation view of the embodiment of FIG. 5.

FIG. 19 is a cross-section view taken at line 19-19 of FIG. 1.

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1A:
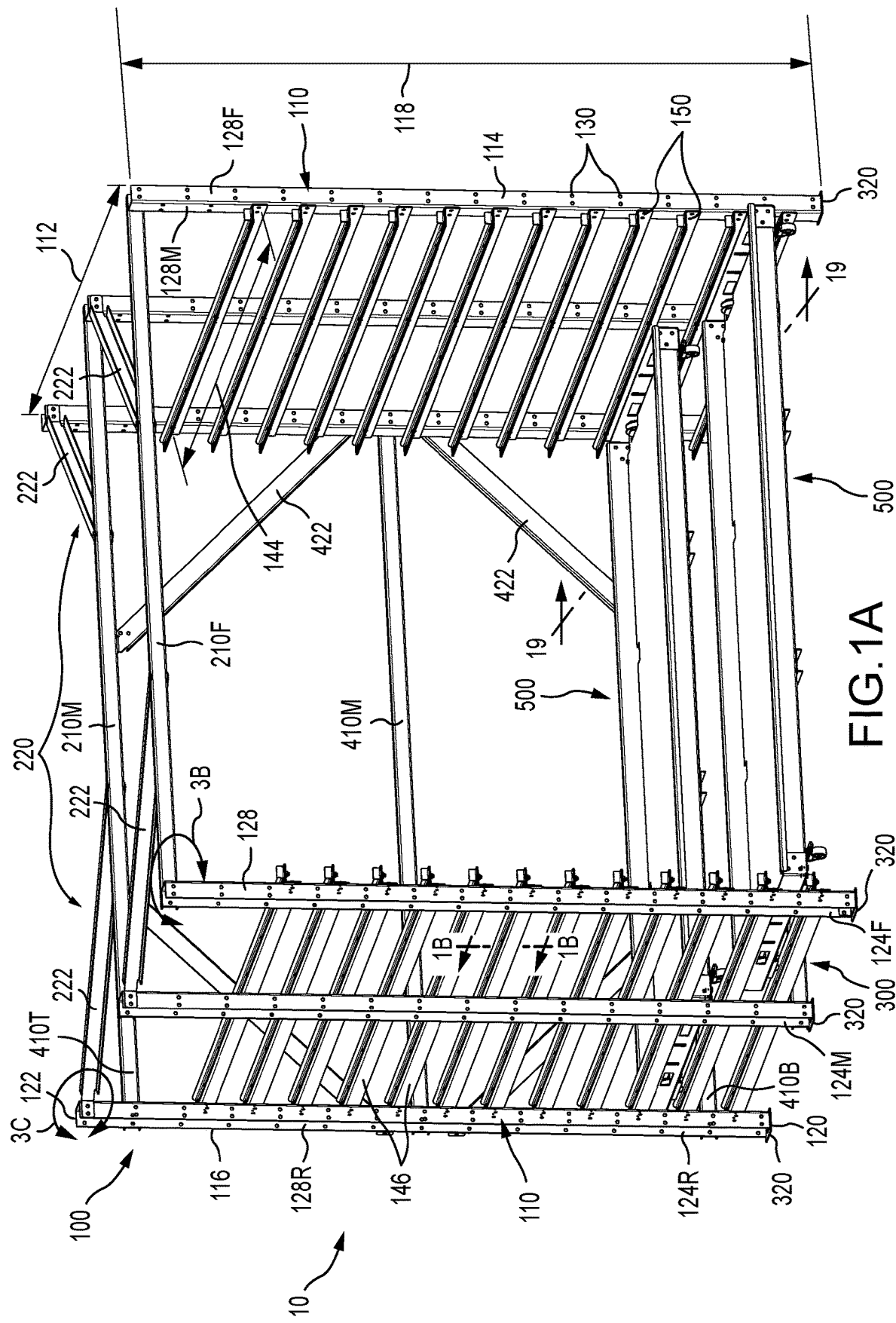
FIG. 1A is a perspective view of an embodiment of a storage rack according to the present invention.

Turning to FIG. 1, a first embodiment 10 of a storage rack according to the present invention includes a frame 100 and one or more translatable shelves 500.

The frame 100 generally forms a parallelepiped cavity 102 defined by opposing side frames 110, a top frame 200, a bottom frame 300 and a back frame 400. Each side frame 110 is preferably substantially a mirror image of the other side frame 110. A side frame 110 extends along a depth 112 from and including a front edge 114 to and including a rear edge 116. The side frame 110 extends along a height 118 from and including a bottom end 120 to and including a top end 122.

Figure 3A:
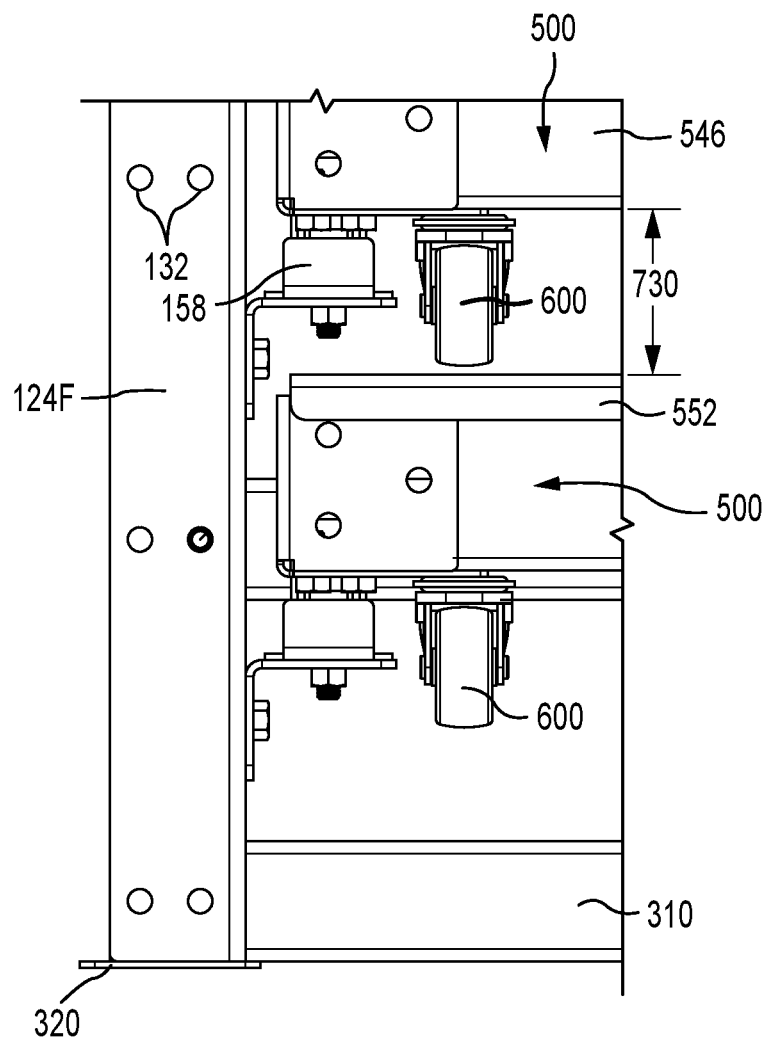
FIG. 3A is a second front elevation view, taken at circle 3A of FIG. 2.
Figure 3B:
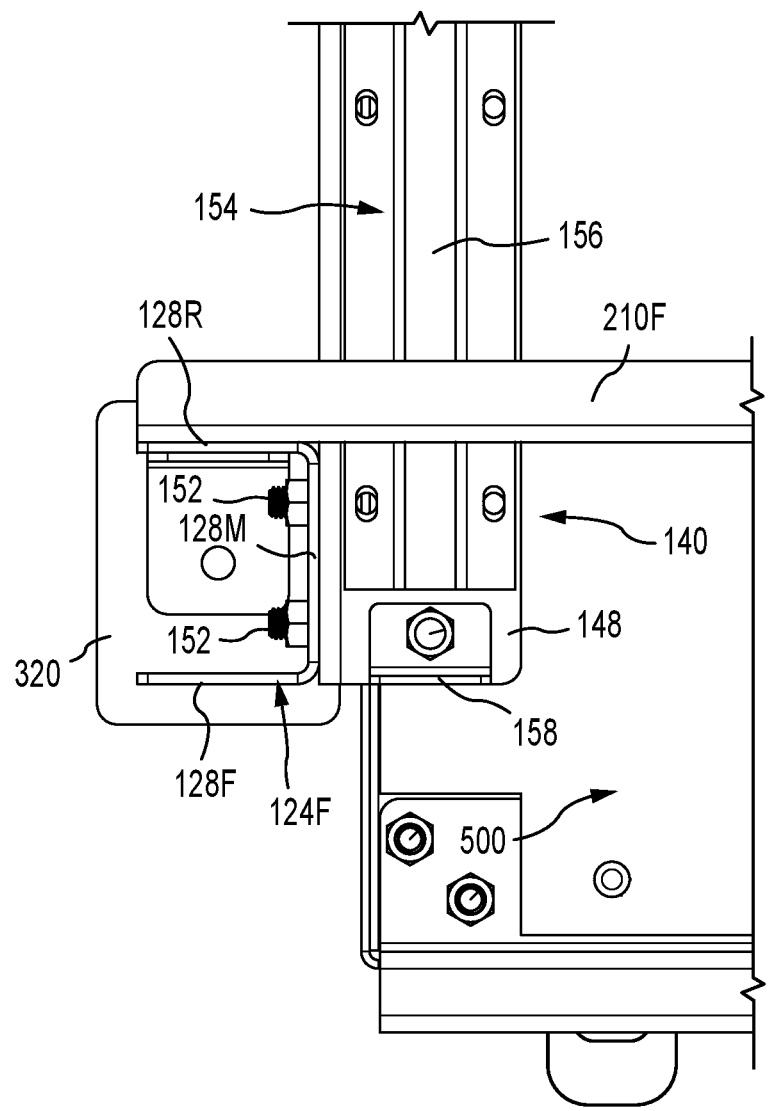
FIG. 3B is a first top plan view taken at circle 3B of FIG. 1.
Figure 3C:
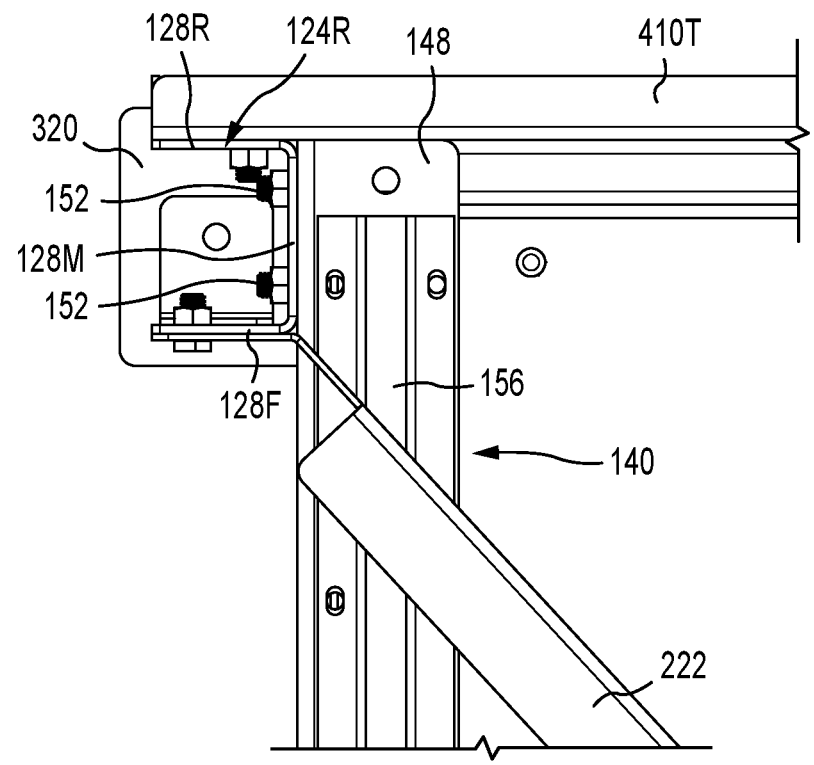
FIG. 3C is a second top plan view taken at circle 3C of FIG. 1.

Each side frame 110 includes a plurality of vertical support members 124, such as a front vertical member 124F forming the front edge 114 and a rear vertical member 124R forming the rear edge 116. Additional vertical support members 124 may be included, depending on load requirements. Preferably, a medial vertical member 124M is provided. All vertical support members 124 on each side frame 110 are longitudinal members extending along a length 126, which may be arranged in a substantially parallel relationship to each other, defining a majority or all of the height 118 of the side frame 110. Each vertical support member 124 is preferably formed from extruded metal (e.g., 10 gauge steel) and having a cross-section (taken perpendicular to its length 126) including at least two side walls (L-shaped cross-section). More preferably, the vertical support members 124 have a cross-section including three side walls 128 (U-shaped cross-section), but a tubular member (having a closed cross-section with one, (circular), three (triangular), or four (rectangular) side walls) could also be used. While extruded metal is a preferred material, such that each vertical support member 124 is integrally formed, the vertical support members 124 may be constructed by welding or otherwise securing multiple components together. For instance, two longitudinal pieces of angle iron (having an L-shaped cross-section) may be secured with overlapping surfaces to form a member with a U-shaped cross-section. Anchor points 130 are provided along the length 126 of the vertical support members 124. The anchor points 130 are preferably apertures 132 formed through a side wall 128, substantially perpendicular to the length 126 of the support member 124. The anchor points 130 may be customized for a particular frame size or installation site, but more preferably the anchor points 130 are provided in a recurring pattern of horizontal pairs 134 of apertures 132 spaced some predetermined distance (e.g., about six inches) along the length 126 of the support member 124. More preferably, if the support member 124 includes a front side wall 128F and a rear side wall 128R, as shown, the pairs 134 of anchor points 130 on those side walls are at least substantially aligned to form a pair of complete throughholes extending through the entire support member 124. Then, on an inner side wall 128M, the pairs 134 of anchor points 130 are preferably longitudinally offset from the pairs 134 on the front 128F and rear 128R side walls, so as to be placed along the length 126 approximately half-way between pairs 134 on the front 128F and rear 128R side walls. This helps provide access to and reduce interference between obliquely disposed anchor points, as shown in FIGS. 3A and 3C.

Figure 1B:
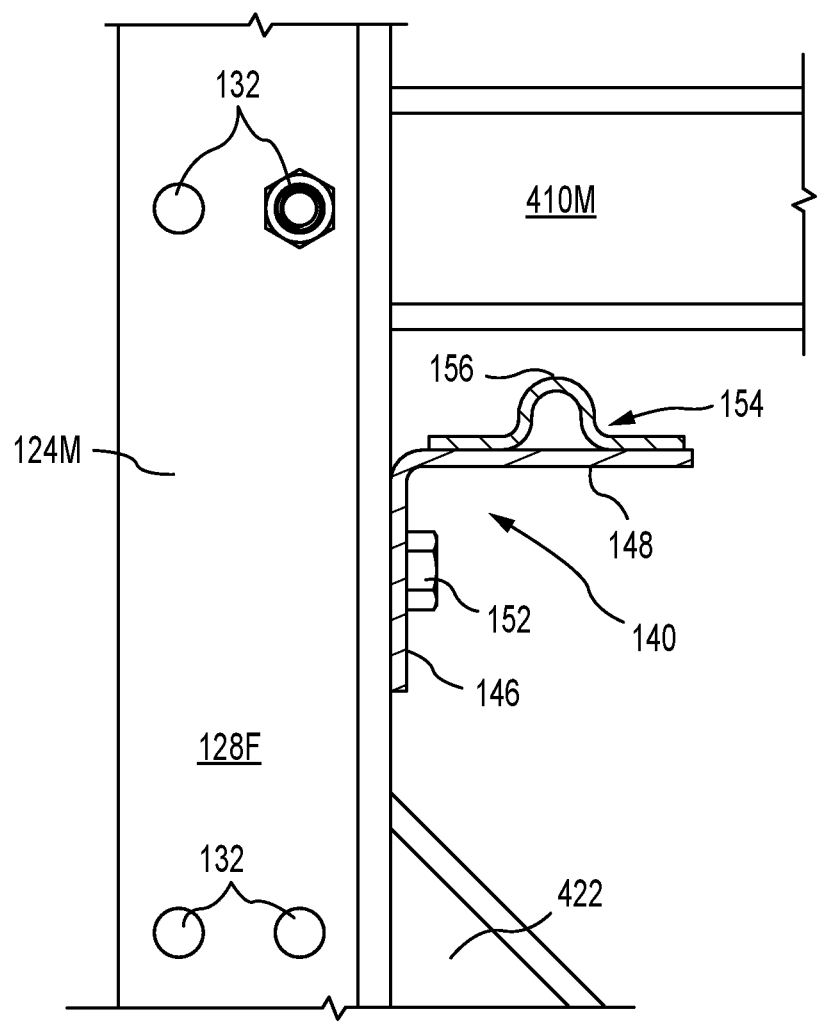
FIG. 1B is a partial cross-section view taken along line 1B-1B in FIG. 1A.
Figure 2:
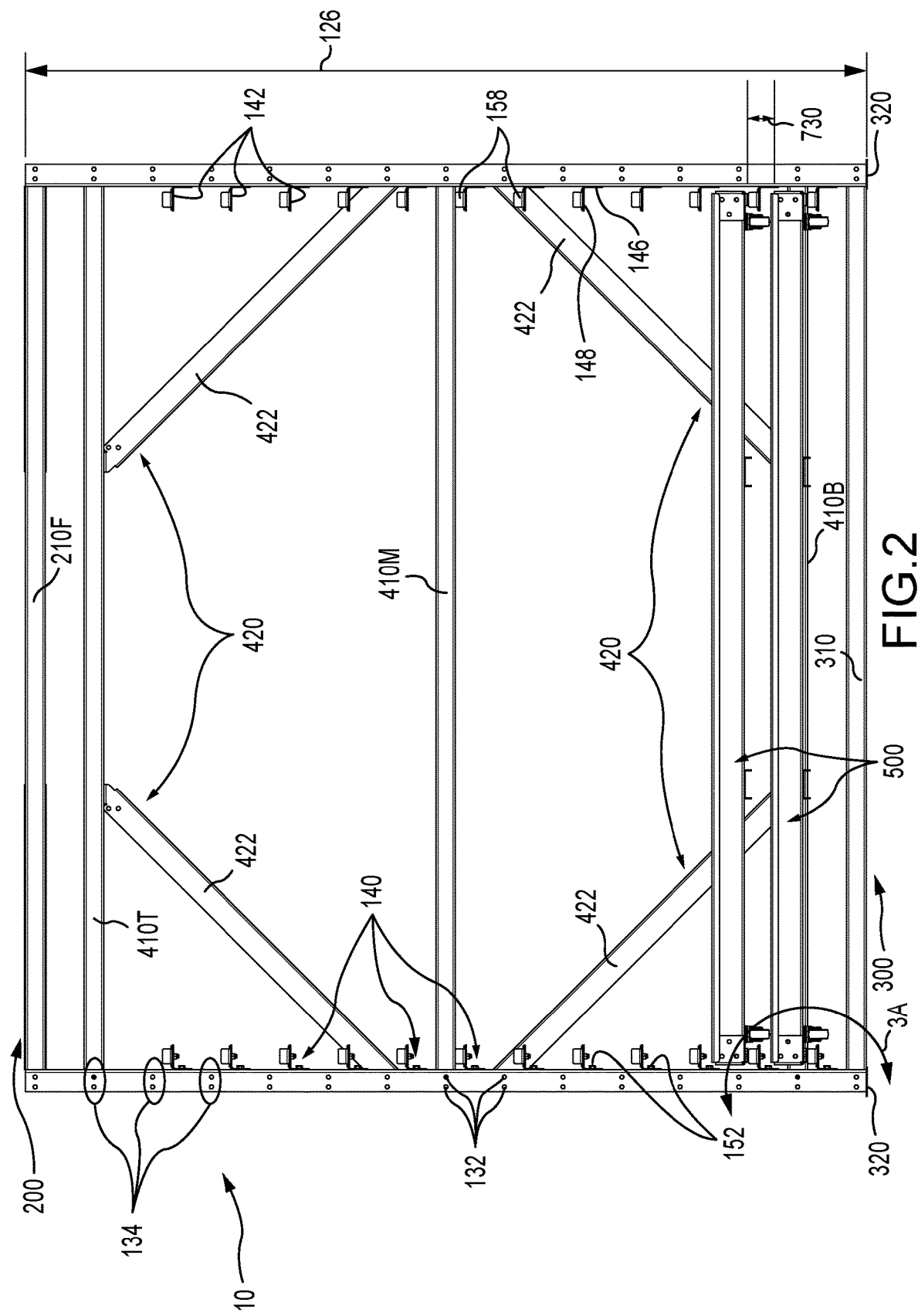
FIG. 2 is a front elevation view of the embodiment of FIG. 1.

Extending between the vertical support members 124 of a side frame 110 are a plurality of rails 140. The rails 140 preferably include longitudinal members 142 formed of extruded or otherwise formed (e.g., bent sheet) metal (e.g. 10 gauge steel) that extend along a length 144 that is substantially equal to the depth 112 of the side frame 110. In use, the rails 140 are preferably coupled to the vertical support members 124 to remain substantially horizontal. The rails 140 are secured to anchor points 130 on the vertical support members 124, such as one or more anchor points 130 on each support member 124. The rails 140 preferably have an L-shaped cross-section with a first leg 146 and a second leg 148, as shown in FIG. 1B, and include rail anchor points 150 (e.g. holes) formed in the first leg 146 to substantially align with anchor points 130 on each support member 124, such as the pairs 134 of anchor points 130 formed on the inner wall 128M of the vertical support members 124. To couple a rail 140 to the support members 124 of a side frame 110, fasteners 152 (e.g. bolts) may extend through the rail anchor points 150 and mating anchor points 130 on the vertical support members 124 and secured with a mating coupling member (e.g., nuts shown in FIGS. 3B and 3C). A plurality of vertically spaced apart rails 140 can be selectively attached to the vertical support members 124 to obtain any desired custom spacing between shelves 500, as further described below. The intervals or spacing between the rails 140 can also be varied to allow for various heights of materials to be placed between the rails 140, or between adjacent drawers 500.

Disposed on top of and secured to, or formed integrally with, the second leg 148 of each rail 140 is a longitudinal track member 154 extending along at least a majority of the depth 112 of the side frame 110. The track member 154 preferably has a male (rib 156, as shown) or female (race, not shown) structure extending along its length to mate with a follower (e.g., wheel, sheave, etc.) 590 coupled to a shelf 500, as further described below. Preferably, a shelf-stop 158 is provided near the front edge 114 to impact some portion of the shelf 500 and prevent further outward translation of the shelf 500 while the follower 590 is in contact with the track member 154. At least one pair of rails 140 (one rail 140 on each side frame 110) is provided, but preferably a plurality of rails 140 (e.g., an even or odd number) is provided on each side frame 110, and more preferably, the same number of rails 140 is provided on each side frame 110, to hold the shelves 500 horizontally when they are placed on the rails 140.

The top frame 200 generally includes a plurality of brace members providing structural support in the frame 100. A preferred top frame 200 includes a pair of lateral brace members 210, each lateral brace member 210 extending from and secured to a vertical support member 124 of a first side frame 110, and extending to and secured to a vertical support member 124 of a second side frame 110. For instance, a first lateral brace member 210M may extend from a medial vertical support member 124M on a first side frame 110 to a medial vertical support member 124M on a second side frame 110. A second lateral brace member 210F may extend from a front vertical support member 124F on the first side frame 110 to a front vertical support member 124F on the second side frame 110. The lateral brace members 210 are secured to the vertical support members 124 at one or more anchor points 130, or otherwise secured thereto, such as by welding.

The top frame 200 also includes two pairs 220 of gusset brace members 222. Each gusset brace member 222 extends from and is secured to a vertical support member 124 of a side frame 110, and extends to and is secured to a lateral brace member 210 of the top frame 200. For instance, a first pair 220 of gusset brace members 222 extend from rear vertical support members 124R of the side frames 110 to the lateral brace member 210M that is secured to the medial vertical support members 124M of the side frames 110. A second pair 220 of gusset brace members 222 extend from medial vertical support members 124M of the side frames 110 to the lateral brace member 210M that is secured to the front vertical support members 124F of the side frames 110.

The bottom frame 300 and back frame 400 generally provide further bracing for the frame 100, thereby providing structural integrity. The bottom frame 300 includes one or more bottom lateral brace members 310, which extend between and are secured to the side frames 110. The bottom lateral brace member (s) 310 is intended to at least prevent spreading or splaying of the bottom of the side frames 110 under load. Also provided on the bottom of each side frame 110 may be foot plates 320, such as one secured to the bottom of each vertical support member 124. The foot plates 320 provide a resting surface area that is preferably larger than the area encompassed by the perimeter of the cross-section of the vertical support member 124.

The back frame 400 includes a plurality of back lateral brace members 410, each of which extends from and is secured to a rear vertical support member 124 of one side frame 110, and extends to and is secured to a rear vertical support member 124 of another side frame 110. Three back lateral brace members 410 may be provided, a first 410B closer to the bottom than the top of the rear vertical support members 124R, a second 410T closer to the top than the bottom of the rear vertical support members 124R, and a third 410M between the other two, preferably mounted at approximately half of the height 118. The back frame 400 also includes two pairs 420 of back gusset brace members 422. Each back gusset brace member 422 extends from and is secured to a rear vertical support member 124R of a side frame 110, and extends to and is secured to a back lateral brace member 410 of the back frame 400. For instance, a first pair 420 of back gusset brace members 422 extend from rear vertical support members 124R of the side frames 110 to the top back lateral brace member 410T that is secured to the rear vertical support members 124R of the side frames 110. A second pair 420 of back gusset brace members 422 extend from rear vertical support members 124R of the side frames 110 to the bottom back lateral brace member 410B that is secured to the rear vertical support members 124R of the side frames 110.

Turning now to FIGS. 4-19, an embodiment 500 of a shelf according to the present invention is illustrated and described. Each shelf 500 generally includes a shelf frame 510 supporting a shelf bottom 570, and one or more followers 590 configured to cooperate with the track members 154 described previously. The shelf frame 510 includes opposing left and right shelf end brackets 520 and opposing front and rear shelf lateral brackets 540. The followers 590 roll or glide along the track members 154 and permit relatively easy movement, such as by a human hand without the need of additional mechanical assistance, of the shelves 500 along the track members 154.

Turning more particularly to FIGS. 6-12, the shelf end brackets 520 are most preferably substantially identically configured, such that they may be used at either end. A shelf end bracket 520 generally has an L-shaped cross-section extending longitudinally along a shelf depth 522. The bracket 520 has a ledge 524 (which may be disposed substantially horizontally to support the shelf bottom 570) coupled to a wall 526 (which may be disposed substantially vertically to provide lift points and structural support), the interior angle (e.g., less than 180 degrees, and more preferably about 90 degrees) of such coupling establishing a generally inward direction 528. The wall 526 extends from a first end 526a to a second end 526b. Towards or at each end of the wall 526 is a lateral bracket support tab 530 extending inwardly. The support tab 530 may be coupled to or formed integrally with the ledge 524 or the wall 526.

Formed in the ledge 524 are one or more (preferably two to five) follower mounting slots 532, shaped to receive a follower 590 which is secured to the bracket 520. Each follower 590 includes a pillow block 592 and a wheel or sheave 594 rotatably mounted to the pillow block 592 by an axle 593. The wheel 594 may include a groove to cooperate with the rib 156, previously described. When the follower is mounted to the bracket 520 (such as by bolting the pillow block 592 to the ledge 524), the wheel 594 is configured to rotate in a plane that is at least substantially parallel to the wall 526, or when the shelf 500 is received within the frame 100 at least substantially parallel to the side frames 110 and/or at least substantially perpendicular to a plane including the front edges 114 of the side frames 110.

Figure 5:
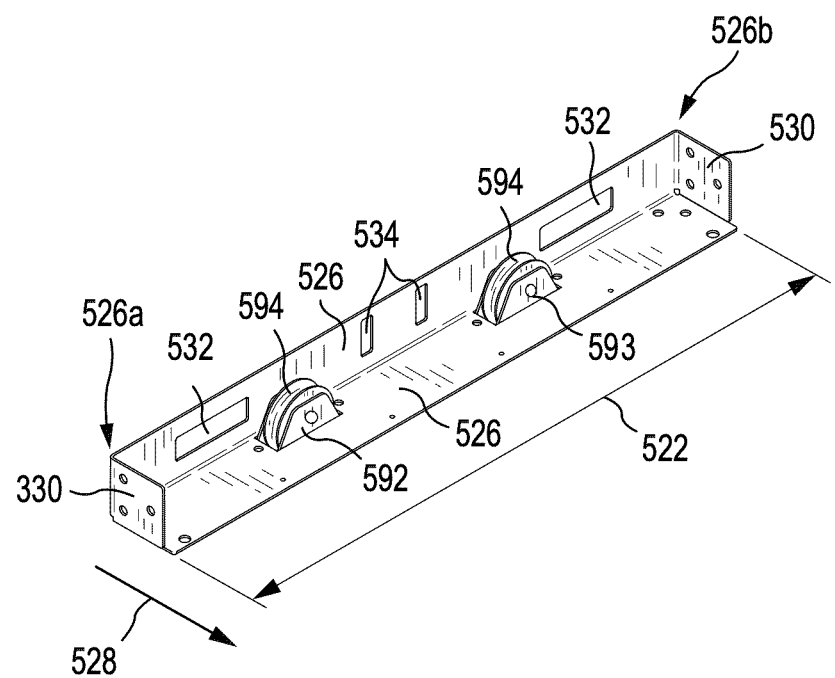
FIG. 5 is a perspective view of an embodiment of a shelf end bracket according to the present invention.
Figure 10:
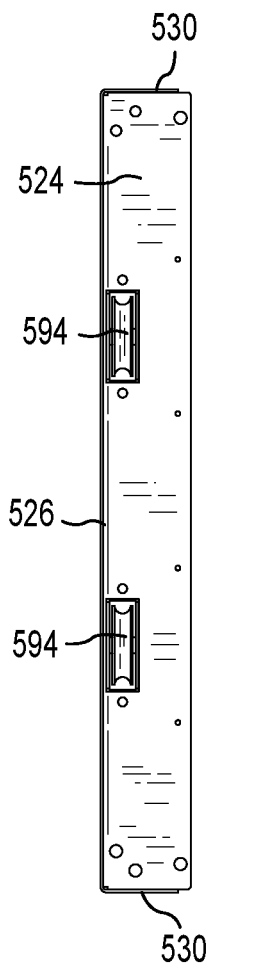
FIG. 10 is a top plan view of the embodiment of FIG. 5.
Figure 11:
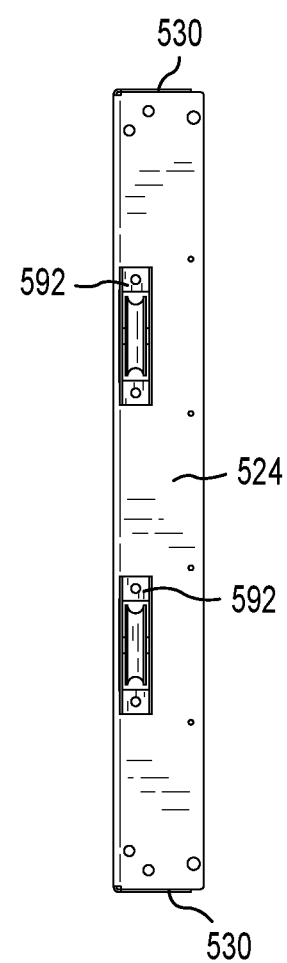
FIG. 11 is a bottom plan view of the embodiment of FIG. 5.
Figure 12:
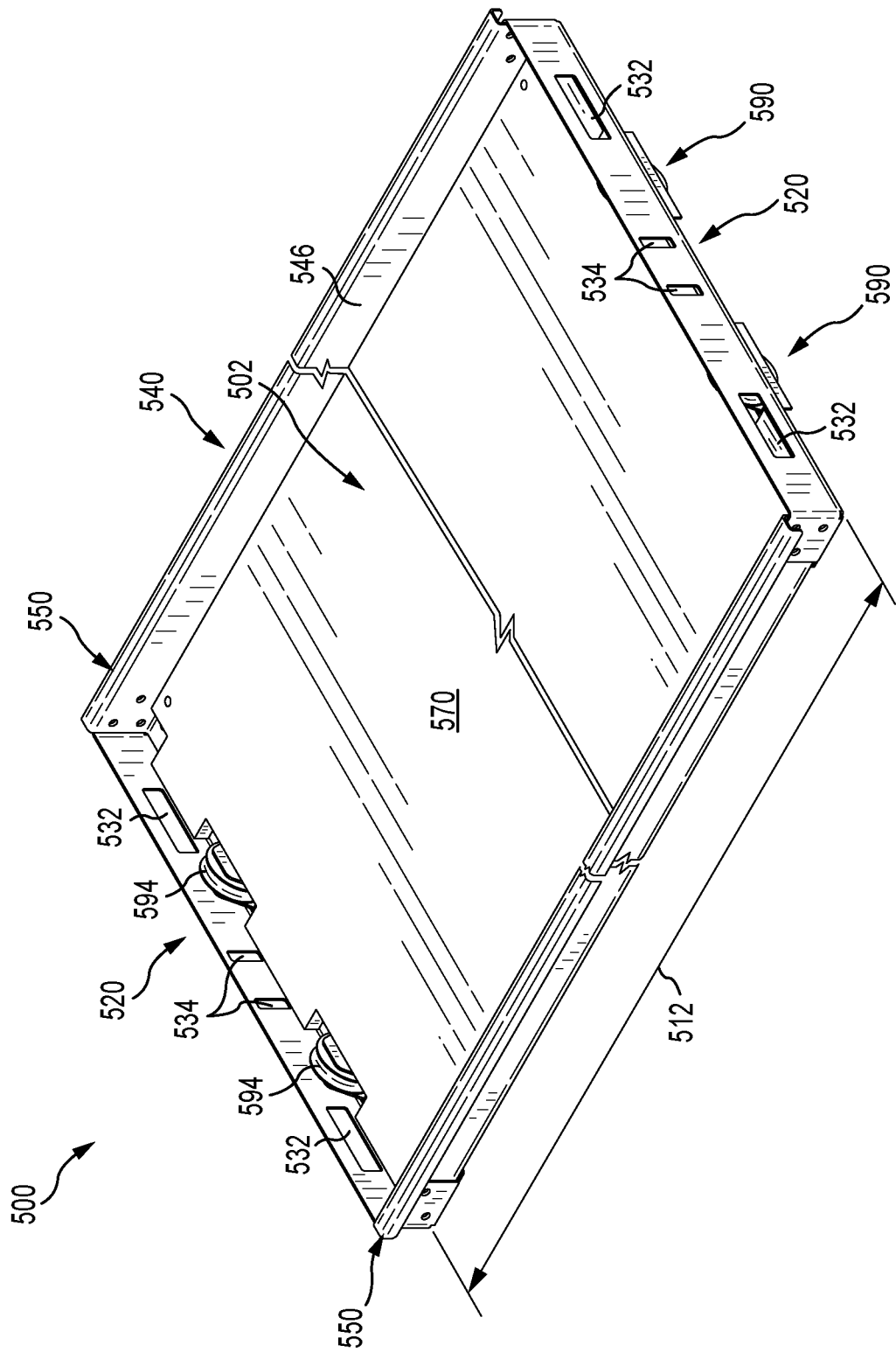
FIG. 12 is a perspective view of an embodiment of an assembled shelf according to the present invention.
Figure 13:
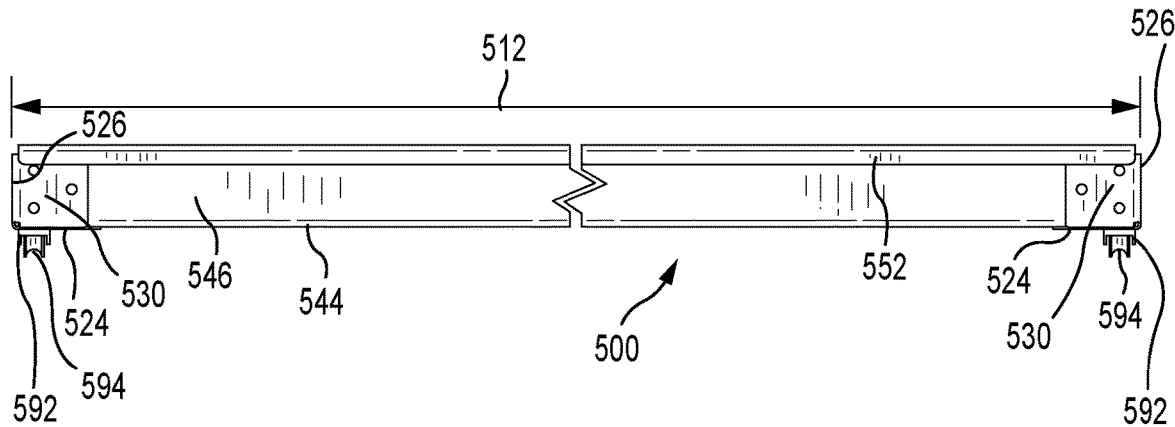
FIG. 13 is a front elevation view of the embodiment of FIG. 12.
Figure 14:
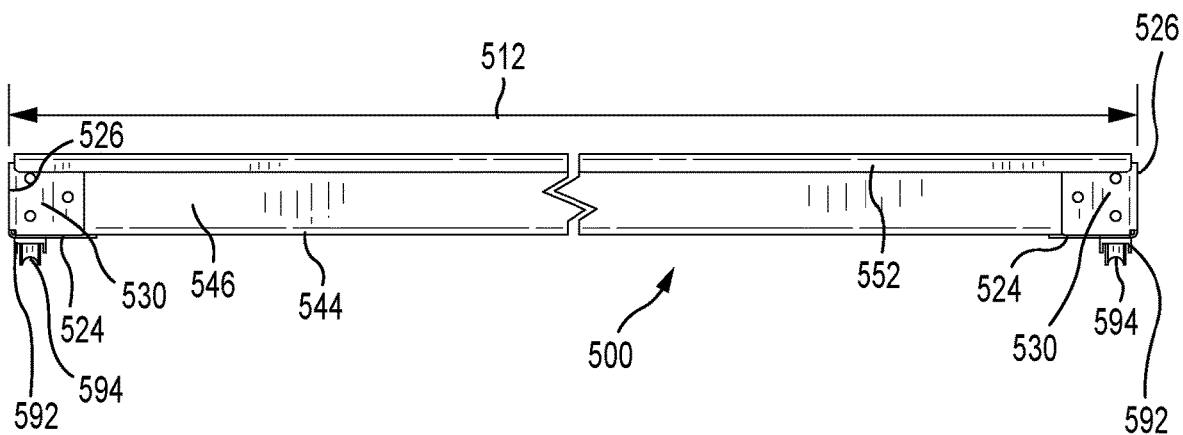
FIG. 14 is a rear elevation view of the embodiment of FIG. 12.
Figure 15:
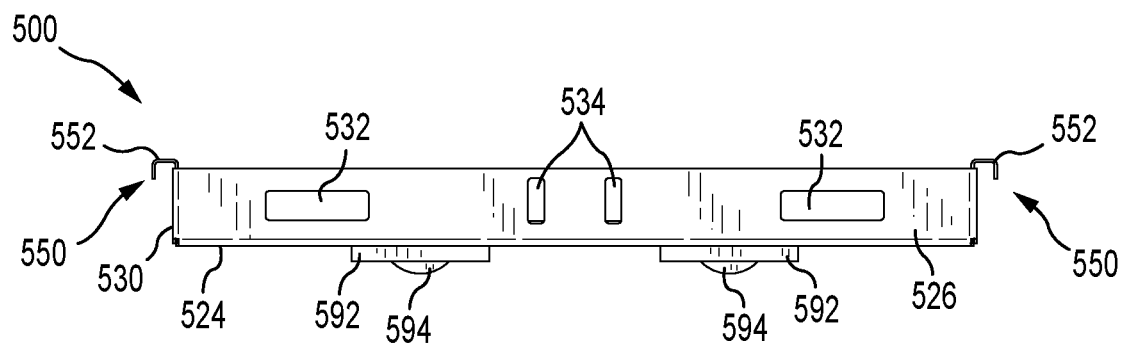
FIG. 15 is a right elevation view of the embodiment of FIG. 12.
Figure 16:
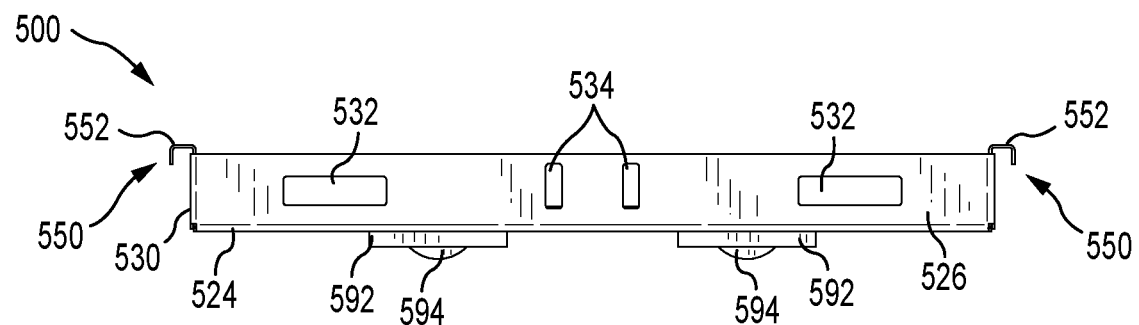
FIG. 16 is a left elevation view of the embodiment of FIG. 12.
Figure 17:
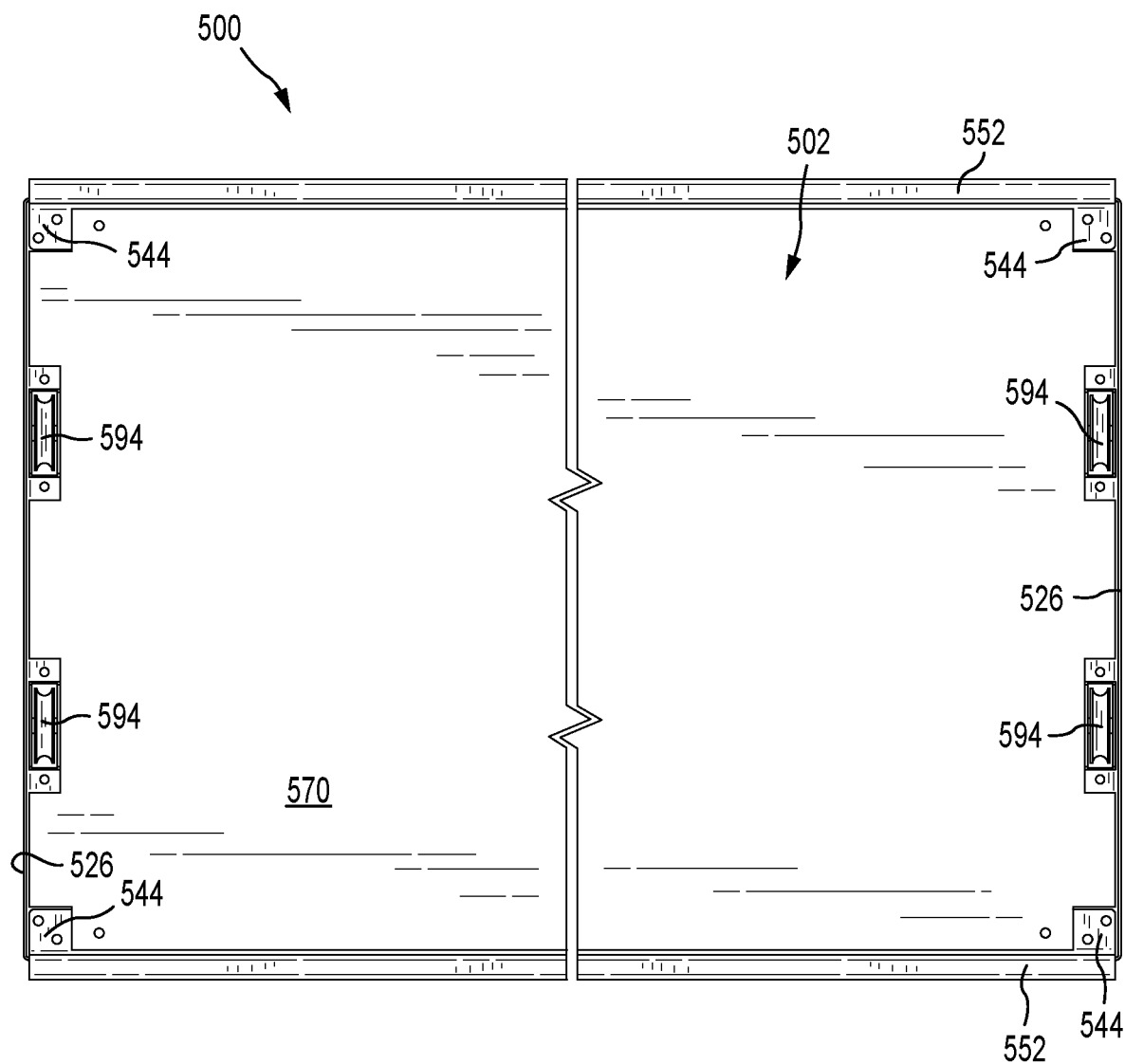
FIG. 17 is a top plan view of the embodiment of FIG. 12.
Figure 18:
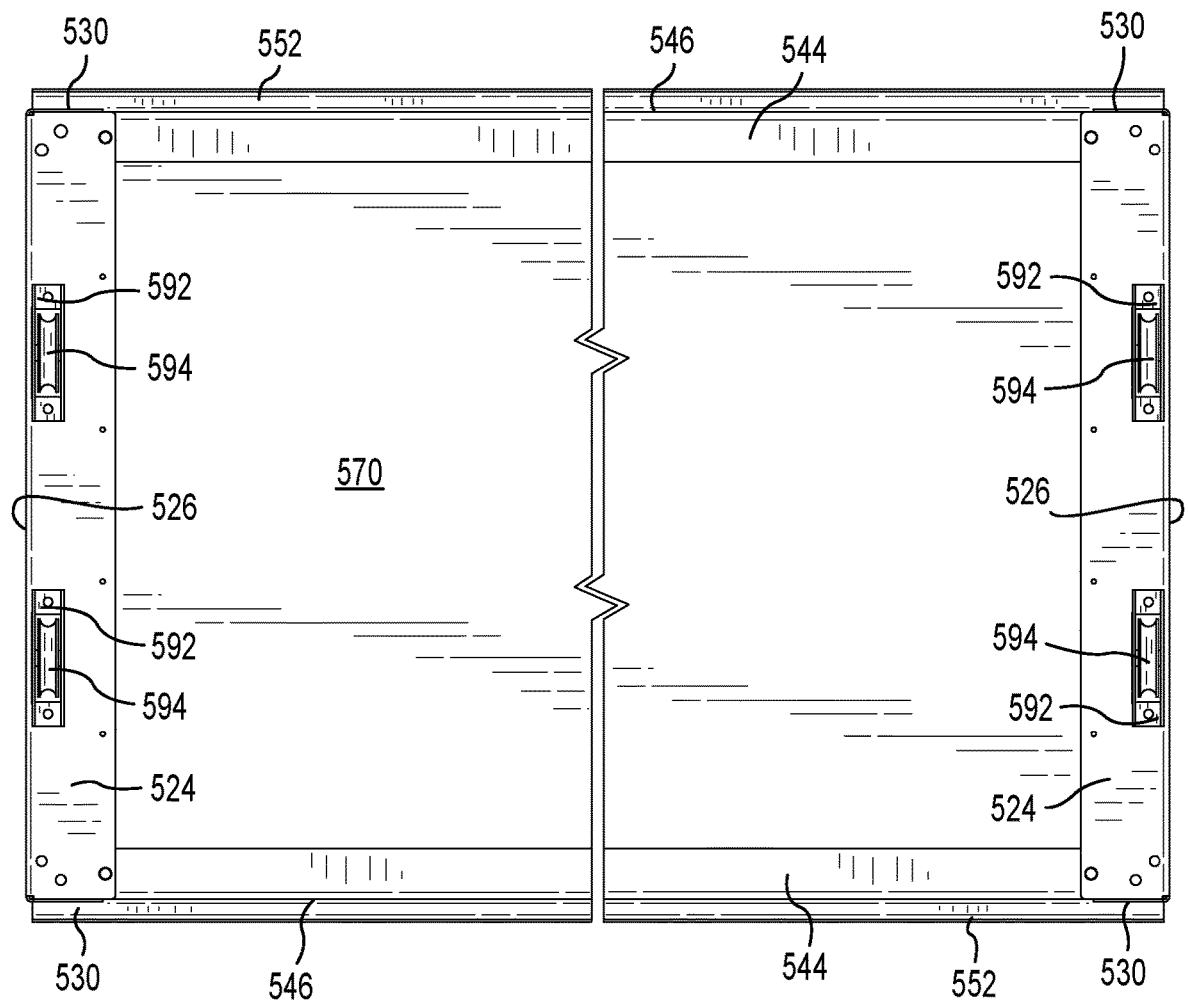
FIG. 18 is a bottom plan view of the embodiment of FIG. 12.

As can be seen in FIGS. 5 and 8, the wheel axle 593 is above the ledge 524. As a result, a majority of the wheel 594 lies above the ledge 524 and within the drawer cavity 502. This significantly reduces the overall height of the shelf 500 and permits closer vertical spacing of the shelves 500 in the frame 100.

Follower mounting slots 532 may also be formed in the wall 526 (preferably in a different spaced orientation from the slots 532 formed in the ledge 524) such that the wall 526 is usable in a first orientation, where the ledge 524 is disposed substantially horizontally and supports the followers 590, and usable in a second orientation (the oblique orientation), where the wall 526 is disposed substantially horizontally and supports the followers 590. In this fashion, a single set of brackets 520 may provide a plurality of predetermined orientations for the followers 590, which may depend on frame 100 sizing and load requirements. The follower mounting slots 532 not being used to receive followers 590, such as those disposed in a vertical orientation on the wall 526, as shown, may be used as hoist connection points.

While the mounting slots 532 may be used for hoisting or otherwise maneuvering the shelf 500 (especially when the shelf 500 and/or shelved stowage is heavy (e.g., greater than 100 pounds or even greater than 70 pounds), there may be provided one or more hook slots 534 provided in the vertical side of the end bracket (i.e., the wall 526 or ledge 524 in the oblique orientation) to enable coupling to a hand truck. The end brackets 520 are preferably formed from an extruded and/or or stamped, bent, or otherwise formed relatively rigid material (e.g., 12 gauge steel), or even plastic materials if load requirements can be met. However, the end brackets 520 are most preferably cut from stock sheet material, such as by laser, plasma, or waterjet cutting or by stamping, and then desired reinforcement or structural features are bent into the cut sheet material with a press break.

The front and rear lateral brackets 540 of the shelf 500 are preferably at least substantially identical. A shelf lateral bracket 540 generally extends along a longitudinal length 542, from a first end 542a to a second end 542b. The bracket 540 preferably includes a ledge 544 coupled to a sidewall 546, the ledge 544 and sidewall 546 extending from the first end 542a to the second end 542b, and being coupled at approximately a ninety-degree angle. Extending from the sidewall 546 in a direction opposite the ledge 544 is a handle 550, which may be an L- or U-shaped channel 552 coupled to or formed integrally with the bracket sidewall 546. The channel 552 may extend along only a minimal portion of the length 542, a majority of the length 542, or the entire length 542. Also, while both lateral brackets 540 are preferably substantially identical, it may be desirable in some situations to have a preferred front-to-back orientation, such that the handle 550 is provided on only one of the lateral brackets 540, which may be the lateral bracket 540 that is situated closest to the front edges 114 of the side frames 110 when the shelf 500 is received in the frame 100. When the shelf frame 510 (including two end brackets 520 and two lateral brackets 540) is assembled, the lateral bracket ends 542a, b preferably rest inward 528 of the end bracket walls 526 (or inward of ledges 524, if oriented in an oblique orientation). The ledge 544 may be secured to the end bracket ledge 524 (or wall 526 in the oblique orientation), such as by being bolted or otherwise secured thereto, such as by welding. The sidewall 546 may be secured to the end bracket wall 526 (or ledge 524 in an oblique orientation), such as by being bolted or otherwise secured thereto, such as by welding. If fastener anchor points (e.g. apertures) are formed in the frame members 520, 540, the anchor points are preferably formed in patterns that may be used in either the first orientation the or oblique orientation. Alternatively, different fastener anchor point patterns may be provided and keyed, shaped or otherwise indicated to be used together in the first orientation or the oblique orientation. The lateral brackets 540 are preferably formed from an extruded and/or or stamped, bent, or otherwise formed relatively rigid material (e.g., 12 gauge steel), or even plastic materials if load requirements can be met. However, the lateral brackets 540 are most preferably cut from stock sheet material, such as by laser, plasma, or waterjet cutting or by stamping, and then desired reinforcement or structural features are bent into the cut sheet material with a press break.

Once the drawer frame 510 is assembled, it generally provides an open-bottom, parallelepiped drawer cavity 502 generally defined by opposing end bracket ledges 524, opposing lateral bracket ledges 544, opposing end bracket walls 526, and opposing lateral bracket sidewalls 546. The frame 510 extends along the end bracket depth 522 and a frame width 512, the frame width 512 being sufficient to enable the followers 590 to functionally cooperate with the track members 154, previously described. For added support, one or more braces 560 may extend under and between the lateral brackets 540 and may be secured thereto, to assist in maintaining desired spacing between the opposing lateral bracket sidewalls 546. The open bottom of the drawer frame 110 is preferably closed off by a shelf bottom 570. The shelf bottom 570 is formed preferably in a sheet of material, such as plywood (e.g., preferably less than 1" thick) extending between and vertically supported by the opposing end bracket ledges 524 and the opposing lateral bracket ledges 544. While described as a preferred sheet, it is to be understood that the drawer bottom may be provided with positive or negative reliefs (not shown) to support particular stowage on the shelf, and to prevent movement thereof during translation of the shelf 500. About the perimeter of the bottom 570, several access notches and/or rabbets 572 may be provided. The notches 572 provide access for either assembly of the drawer frame 510 or space for the followers 590 to extend into the parallelepiped drawer cavity but yet remain operable (e.g., rotatable). The drawer bottom 570 is preferably secured to the drawer frame 510, either by screws, nuts/bolts, adhesive, etc. As an additional feature, a plurality of casters 600 (e.g., two to four casters) may be rotatably and pivotably secured to one or more of the shelves 500, preferably near the junction of the end brackets 520 and the lateral brackets 540. Such casters 600 may enhance mobility of the shelf 500, if the shelf 500 is removed from the frame 100 and placed on a support surface, such as a floor. If casters 600 are used on a shelf 500, they are preferably suspended from a lower portion of the shelf 500 while the shelf 500 is disposed in the frame 100. Accordingly, the casters 600 preferably do not vertically support any of the weight of the shelf 500 while the shelf 500 is in the frame 100, and supported by the followers 590.

Turning now to FIG. 19, preferred uses and orientations of the shelves 500 in the frame may be more clearly described. As shown, a first shelf 500A is shown supported in the frame 100 by cooperation of the followers 590 with a first track member 156. A second shelf 500B is shown supported in the frame 100 by cooperation of its followers 590 with a second track member 156. The shelves 500 may be laterally translated in a rearward 12 or forward 14 direction without interference from the next closest shelf 500. While the followers 590 are cooperating with a rail 156, travel of a shelf 500 in the rearward 12 direction is preferably limited by contact between some portion of the shelf 500 (e.g., the handle 550) and a portion of the frame 100, such as a back gusset frame member 422 or a back lateral brace member 410. While the followers 590 are cooperating with a rail 156, travel of a shelf 500 in the forward 14 direction is preferably limited by contact between some portion of the shelf 500 (e.g., the follower pillow block 592) and a portion of the frame 100, such as the shelf stop 158. Alternatively, while the followers 590 are cooperating with a rail 156, travel in the rearward direction 12 and/or forward direction 14 may be unlimited (i.e., the frame 100 may exclude structure that would otherwise interfere with shelf translation).

In this way, relative spacing of certain structural features may enhance the function and operability of shelving according to the present invention. That is, when a plurality of shelves 500 are received in the frame 100 on vertically adjacent rails 156, lateral translation of the shelves 500 may be provided at desired intervals. For instance, on a first shelf 500 (e.g., a lower shelf 500A), a first access stop depth 710A is defined as a front-to-back (e.g., horizontal) distance measured from the contact point between the frame 100 and the shelf 500A, which prevents movement in the forward direction 14, and measured to the sidewall 546 of the rearward lateral bracket 540 of the first shelf 500A. Then, when the second shelf 500 (e.g., an upper shelf 500B) is in its most rearward position (e.g., the shelf 500B is contacting the rear frame 400), a second access stop depth 710B is defined as a front-to-back (e.g., horizontal) distance measured from the contact point between the frame 100 and the first shelf 500A, which prevents movement in the forward direction 14, and measured to the sidewall 546 of the forward lateral bracket 540 of the second shelf 500B.

Alternatively or additionally, on the first shelf 500 (e.g., a lower shelf 500A), a first removal stop depth 720A is defined as a front-to-back (e.g., horizontal) distance measured from the contact point between the frame 100 and the shelf 500A, which prevents movement in the forward direction 14, and measured to the most rearward portion of the first shelf 500A (e.g., the most rearward portion of the channel 552). Then, when the second shelf 500 (e.g., an upper shelf 500B) is in its most rearward position (e.g., the shelf 500B is contacting the rear frame 400), a second removal stop depth 720B is defined as a front-to-back (e.g., horizontal) distance measured from the contact point between the frame 100 and the first shelf 500A, which prevents movement in the forward direction 14, and measured to the most forward portion of the second shelf 500B (e.g., the most forward portion of the channel 552).

An advantageous relationship of the access stop depths 710A, B is that the first access stop depth 710A is less than or equal to the second access stop depth 710B. In this way, substantially all of the drawer cavity 502A of the first shelf 500A is vertically accessible without significant vertical obstruction from the second shelf 500B. More preferably, the first access stop depth 710A is less than or equal to the second removal stop depth 720B, so as to remove all vertical obstruction from the second shelf 500B. An advantageous relationship of the removal stop depths 720A, B is that the first removal stop depth 720A is less than or equal to the second removal stop depth 720B. In this way, the first drawer 500A may be removed from the frame without significant vertical obstruction from the second shelf 500B. More preferably, the first removal stop depth 710A is less than or equal to the second removal stop depth 720B, so as to remove all vertical obstruction from the second shelf 500B, thereby allowing the first shelf 500A, when in its most forward position with the followers 590 cooperating with the rails 156, to be lifted vertically off of the rails 156, over the shelf stops 158, and removed from the frame 100.

While advantageous depths have been described, additional or alternative height dimensions may also be achievable with according shelving to the present invention. For instance, when a plurality of shelves 500 are received in the frame 100 on vertically adjacent rails 156, vertical spacing may be provided at desired intervals. For instance, a stowage height 730 may be defined as a vertical distance measured from the horizontal plane including the highest vertical point on the frame 510 of the first shelf 500A (e.g., the top of the handle channel 552) and measured to the horizontal plane including the lowest vertical point on the frame 510 of the second shelf 500B (e.g., the bottom of the ledge 524 of the end brackets 520). To enable desired shelf density (e.g., which may be desirable if shelves 500 are employed to handle flat, round or tubular stock) within the frame height 118, the stowage height 170 is preferably one to six inches, more preferably one to four inches, and most preferably one to three inches. While an alternative stowage height 170 may be utilized (and even different stowage heights 170 may be used in the same frame), the preferred stowage height 170 is acceptable to allow both stowage of materials within the drawer cavity 502 and to facilitate shelf translation and/or removal by use of standard forklifts, even if adjacent shelves 500A, B are disposed at their most forward positions.

If additional stowage height 170 is desirable for a particular application, one or more upper shelves 500 may be removed from, or never inserted into, the frame 100. In this manner, a lower shelf 500A may be used to support stowage that is taller and would otherwise interfere with shelf translation if an upper shelf 500B were utilized. Thus, though the frame 100 in the disclosed embodiment 10 is shown as having rails 156 sufficient to support twelve shelves 500, all of the shelves 500 may be inserted into and supported by the frame 100, or any other number (1-11) of shelves 500 may be inserted into and supported by the frame 100.

The foregoing is considered as illustrative only of the principles of the invention. Furthermore, since numerous modifications and changes will readily occur to those skilled in the art, it is not desired to limit the invention to the exact construction and operation shown and described. For instance, while terms like "vertical" and "horizontal" are used throughout, the terms are intended for general reference. Though technically such terms may include precise vertical and horizontal directionality, such precision is not required to fall within the scope of the description. While the preferred embodiment has been described, the details may be changed without departing from the invention, which is defined by the claims.

What is claimed is:

1. A shelving system comprising:
    a frame including first and second side frames extending along a side frame depth at least substantially parallel to a direction of travel, the first side frame disposed opposite the second side frame across a storage cavity;
    first and second track members supported by the first side frame, the second track member being disposed vertically above the first track member;
    third and fourth track members supported by the second side frame, the fourth track member being disposed vertically above the third track member;
    a first shelf supported by and movable along the first and third track members, the first shelf comprising a first shelf frame supporting a first shelf bottom, wherein the first shelf frame and first shelf bottom define a first open-top substantially parallelepiped drawer cavity, the first shelf frame comprising a first pair of opposing end brackets disposed directly above the first and third track members;
    a second shelf supported by and movable along the second and fourth track members, the second shelf comprising a second shelf frame supporting a second shelf bottom, wherein the second shelf frame and second shelf bottom define a second open-top substantially parallelepiped drawer cavity, the second shelf frame comprising a second pair of opposing end brackets disposed directly above the second and fourth track members; and
    a first plurality of followers secured to the first shelf and cooperating with the first track member and a second plurality of followers secured to the first shelf and cooperating with the third track member, wherein each of the followers includes a wheel, each wheel being rotatably secured to its respective shelf by an axle positioned within the drawer cavity.

2. The shelving system according to claim 1, wherein each of the first pair of end brackets is substantially identical to the other.

3. The shelving system according to claim 1, wherein each of the second pair of end brackets is substantially identical to the other.

4. The shelving system according to claim 1, wherein each of the first pair of end brackets is substantially identical to the other, and wherein the second pair of end brackets is substantially identical to the first pair of end brackets.

5. The shelving system according to claim 1, wherein each follower comprises a pillow block supporting the axle.

6. The shelving system according to claim 1, the first shelf being movable in opposite forward and rearward directions along the direction of travel between a first forward travel limit position and a first rearward travel limit position; and
    the second shelf being movable in the opposite forward and rearward directions along the direction of travel between a second forward travel limit position and a second rearward travel limit position,
    wherein when the second shelf is in the second rearward travel limit position and the first shelf is in the first forward travel limit position, a majority of the first shelf is within the side frame depth.

7. The shelving system according to claim 6, wherein when the second shelf is in the second rearward travel limit position and the first shelf is in the first forward travel limit position, the storage cavity vertically above the first shelf is completely devoid of any portion of the second shelf.

8. The shelving system according to claim 1, further comprising:
    a fifth track member supported by the first side frame between the first and second track members; and
    a sixth track member supported by the second side frame between the third and fourth track members,
    wherein vertical space between the first shelf and the second shelf is free from any additional shelf.

9. The shelving system according to claim 1, wherein each of the track members includes a rib extending along the direction of travel.

10. The shelving system according to claim 1, further comprising a plurality of casters freely depending downwardly from the second shelf, wherein no amount of weight of the second shelf is supported by the casters while the second shelf is supported by the second and fourth track members.

* * * * *